United States Patent [19]
Sakaki et al.

[11] 3,984,572
[45] Oct. 5, 1976

[54] FEED FOR MONOGASTRIC ANIMALS

[75] Inventors: Yasuhiro Sakaki, Yokohama; Hiroshi Kawai, Tokyo, both of Japan

[73] Assignee: Mitsubishi Chemical Industries Ltd., Tokyo, Japan

[22] Filed: July 14, 1975

[21] Appl. No.: 595,802

[30] Foreign Application Priority Data
July 16, 1974   Japan................................ 49-81347

[52] U.S. Cl. ...................................... 426/2; 426/69; 426/623; 426/630; 426/643; 426/807
[51] Int. Cl.² ...................... A23K 1/00; A23K 1/18
[58] Field of Search ............ 426/69, 623, 630, 635, 426/636, 807, 2, 643; 71/28

[56] References Cited
UNITED STATES PATENTS

| | | | |
|---|---|---|---|
| 2,687,354 | 8/1954 | Gribbins ............................... | 426/69 |
| 3,322,528 | 5/1967 | Hamamoto et al. .................... | 71/28 |
| 3,365,468 | 1/1968 | Feichtinger ............................ | 71/28 |

*Primary Examiner*—A. Louis Monacell
*Assistant Examiner*—R. A. Yoncoskie
*Attorney, Agent, or Firm*—Oblon, Fisher, Spivak, McClelland & Maier

[57]            ABSTRACT

A method of culturing monogastric animals which comprises feeding the animals a feed in which part of the protein is supplied by a urea-isobutyraldehyde condensate.

7 Claims, No Drawings

FEED FOR MONOGASTRIC ANIMALS

BACKGROUND OF THE INVENTION

1. Field of the Invention

This invention relates to a feed for culturing monogastric animals such as fowl, pigs, rabbits and horses 2. Description of the Prior Art Heretofore, feeds for culturing monogastric animals essentially contained agricultural and aquatic products, such as corn, soybean meal, fish meal or the like. The production of these agricultural and aquatic products fluctuates from year to year depending upon the weather and other factors influencing the size of harvests and catches, whereby it has been difficult to obtain a stable supply of feed. Accordingly, there have been attempts to use synthetic compounds instead of natural agricultural and aquatic products as part of the feeds. Synthetic feeds should have high nutritive value as protein sources and as calorie sources, and must be harmless to the animals being fed, of course. Currently, methionine and lysine are being used as artificial feeds for monogastric animals, and urea, isobutylidene diurea and biuret are being used for ruminant animals. Among these compounds, isobutylidene diurea is excellent as an artificial feed for ruminant animals because it is gradually decomposed in the first rumen to form ammonia, whereby it can be utilized for the synthesis of microbial protein of the microorganisms inhabiting the rumen. The microbes are digested and absorbed in a digestive organ below the abomasum so as to be effective for growth of the ruminant animals. Since monogastric animals have a different digestive mechanism from ruminant animals, one of ordinary skill would not have considered that isobutylidene diurea might be effective as a feed for monogastric animals.

SUMMARY OF THE INVENTION

It is one object of the present invention to provide an artificial feed for culturing said monogastric animals as fowl, pigs, rabbits and horses or for promoting the growth of such animals.

This and other objects of this invention as hereinafter will become more readily apparent by the discussion below, have been attained by providing a feed for culturing monogastric animals such as fowl, pigs, rabbits and horses which is enriched with urea-isobutyraldehyde condensate.

DETAILED DESCRIPTION OF THE PREFERRED EMBODIMENTS

In accordance with this invention, an artificial feed is provided for certain monogastric animals having an evolved caecum as discriminated from other monogastric animals. Suitable urea-isobutyraldehyde condensates for use in this invention include isobutylidene diurea produced by reacting 2 moles of urea with 1 mole of isobutyraldehyde, and commercial isobutylidene diurea. In accordance with this invention, the urea-isobutyraldehyde condensate can be combined with natural feeds such as grains, meals and brans, or animal and vegetable leeses. A crude protein (C.P.) product is usually used for fowls and pigs and a digestible crude protein (D.C.P.) product for rabbits and horses. The protein contents of the feeds are given by the values of C.P. or D.C.P.

Suitable natural feeds for use in this invention include said conventional ones as are suitable for feeding fowl, pigs, rabbits and horses. The natural feeds usually include 5–80 wt.% of corn such as Indian corn, barley, oats, crushed barley, corn starch and the like; 1–60 wt.% of bran, wheat bran, defatted rice bran, rice bran and the like; 1–35 wt.% of meals such as fish meal, soybean meal, and potato starch pulp; and, if necessary, a small amount of minerals and vitamins. The amount of crude protein in the feed is usually 5–30 wt.% and of totally digestible nutrient usually 50–90 wt.%. In the case of feed for fowl, it is especially preferred to use a feed with 14–16 wt.% of crude protein and 63–66 wt.% of totally digestible nutrient. In the case of feed for pigs, it is especially preferred to use a feed with 12–16 wt.% of crude protein and 70–75 wt.% of totally digestible nutrient. In the case of feed for rabbits, it is especially preferred to use a feed with 14–15 wt.% of digestible crude protein and 64–66 wt.% of totally digestible nutrient. In the case of feed for horses it is especially preferred to use a feed with 11–13 wt.% of digestible crude protein and 62–70 wt.% of totally digestible nutrient. These compositions can be simple mixtures or can be produced in the form of powder, granules or pellets. The amount of the urea-isobutyraldehyde condensate should be 5–30 wt.% of the total crude protein and, preferably, ¼ – 1/6 of the total crude protein. In a mixed feed, the amount of the urea-isobutyraldehyde should be 0.5 to 4 wt.%, preferably 1–3 wt.%. It is preferred that the feed not be used for very young animals. It is preferred that the feed be used for large chicks of fowl, older piglets, rabbits (90 – 100 days old or older) and horses (9 – 10 months old or older).

It is considered that the reason why a urea-isobutyraldehyde condensate, such as isobutylidene diurea is effective as a feed for culturing the above-mentioned monogastric animals, is that such monogastric animals have an evolved caecum. The urea-isobutyraldehyde condensate promotes microbe fermentation in the caecum wherein the fermented products and the autolysed products of the multiplicated microorganisms are absorbed to promote the growth of said animals. This fact is quite unexpected because it has been considered in the past that non-protein-nitrogen compounds besides amino acids are not absorbed for nourishment by monogastric animals except in the case of a natural protein deficiency. It has also been considered that digestion of substantial amounts of celluloses (high carbohydrates) could not be performed by fowl because of the weakness of the bacteria in the intestine of the fowl. However, when the feed of this invention is used, isobutyraldehyde is formed by the decomposition of the urea-isobutyraldehyde condensate thereby multiplying the cellolytic microbes (microorganisms for decomposing cellulose) so as to enable digestion of the high carbohydrate celluloses.

In accordance with this invention, a part of the protein source of a natural feed can be provided by a synthetic compound, so as to provide a stable supply of economical feed. The feeds of this invention are harmless to the animals even when used over a long term.

Having generally described the invention, a more complete understanding can be obtained by reference to certain specific examples, which are included for purposes of illustration only and are not intended to be limiting unless otherwise specified.

In the examples, the values of crude protein (C.P.) and digestible crude protein (D.C.P.) are as follows:

|  | C.P. (%) | D.C.P. (%) |
|---|---|---|
| Corn | 9.4 | |
| Fish meal | 62.3 | |
| Defatted rice bran | 17.9 | |
| Alfalfa meal | 18.2 | |
| Barley | 11.5 | |
| Pao lees | 13.0 | |
| Dried mycelium | 42.0 | |
| Vitacogen | 9.7 | |
| Wheat bran | 15.4 | 12.5 |
| Soybean meal | 45.8 | 40.1 |
| Oats | | 9.5 |
| Rice bran | | 10.0 |
| Cracked barley | | 9.0 |
| Vine of sweet potato | | 8.0 |
| Milk vetch hay | | 12.0 |
| Hay | | 1.5 |
| Rice straw | | 1.0 |
| Isobutylidene diurea | 193.7 | 135.6 |
| Urea | 290.6 | 203.4 |

In the examples, the ratio of the crude protein value of isobutylene diurea (IBDU) to the total amount of crude proteins and the ratio of the digestible crude protein value of isobutylene diurea (IBDU) to the total digestible crude protein are designated as the substitution ratios of IBDU as follows.

$$\text{Substitution ratio of } IBDU = \frac{C.P. \text{ of } IBDU \times \text{content of } IBDU (\%)}{\text{total } C.P.} \times 100\%$$

(for fowl and pigs)

$$\text{Substitution ratio of } IBDU = \frac{D.C.P. \text{ of } IBDU \times \text{CONTENT of } IBDU (\%)}{D.C.P.} \times 100\%$$

(for rabbits and horses)

EXAMPLE 1

One hundred and sixty superwhite-type hens (26 weeks old) were divided into four groups. They were fed by water feeding ad libitum and each was supplied one of the feed compositions No. 1–4 of Table 1. The rates of egg laying, the average egg weights and the feed conversions were measured. The results are shown in Table 2.

TABLE 1

| Feed Composition | Invention No. 1 | Invention No. 2 | Reference No. 3 | Reference No. 4 |
|---|---|---|---|---|
| Corn | 50. (%) | 50. (%) | 50. (%) | 50. (%) |
| Fish meal | 7 | 7 | 7 | 7 |
| Wheat bran | 5 | 5 | 5 | 5 |
| Defatted rice bran | 4.6 | 4.6 | 4.6 | 4.6 |
| Alfalfa meal | 3 | 3 | 3 | 3 |
| CaCO₃ | 5.2 | 5.2 | 5.2 | 5.2 |
| CaHPO₄ | 1.1 | 1.1 | 1.1 | 1.1 |
| NaCl | 0.4 | 0.4 | 0.4 | 0.4 |
| Minerals-Vitamins | 0.2 | 0.2 | 0.2 | 0.2 |
| Corn starch | 15.5 | 15.5 | 15.5 | 9.7 |
| Cellulose powder | 4 | 4 | 5 | 2.2 |
| Soybean meal | 3 | 3 | 3 | 11.6 |
| Isobutylidene diurea (note 1) | 1 | 2 | — | — |
| Crude protein (%) | 14.51 | 16.44 | 12.57 | 16.51 |
| Total digestible nutrients (%) | 66.81 | 66.81 | 66.81 | 66.27 |
| Substitution rate of IBDU (%) | 13.37 | 23.54 | — | — |

(note 1) Isobutylidene diurea (IBDU) (Manufactured by Mitsubishi Chemical Ind. Ltd.)

TABLE 2

| Feed composition No. | Rate of egg laying (%) (note 2) | Average egg weight (g) | Feed conversion (kg/dozen) (note 3) |
|---|---|---|---|
| No. 1 | 73 | 54 | 1.95 |
| No. 2 | 81 | 54 | 1.86 |
| No. 3 | 70 | 53 | 2.12 |
| No. 4 | 81 | 56 | 1.82 |

(note 2) Rate of egg laying (%)
One egg laid per day for each hen is considered as 100%.

(note 3) Feed conversion (kg/dozen)
Amount of feed required for the laying of 12 eggs.

EXAMPLE 2

Thirty hybrid piglets (Landrace female and a Hampshire male were divided into 3 groups, they were fed by water feeding ad libitum and each was supplied one of the feed compositions No. 5–7 of Table 3 under controlled feeding (4.5 wt.% of the weight of the piglets) for 30 days. The body weight gains and the feed conversions were measured periodically during the feeding. The results are shown in Table 4. The total amount fed from 0 to 30 days was 54 kg.

TABLE 3

| Feed Composition | No. 5 | No. 6 Reference | No. 7 Reference |
|---|---|---|---|
| Corn | 30.6 (%) | 25. (%) | 30.6 (%) |
| Barley | 25 | 25 | 25 |
| Wheat bran | 9 | 9 | 9 |
| Soybean meal | 3 | 6 | 3 |
| Fish meal | 2 | 4 | 2 |
| Pao lees | 19 | 21 | 19 |
| Dried mycelium | 4 | 4 | 4 |
| Vitacogen (Note 4) | 5 | 5 | 5 |
| Ca(PO₄)₂ | 0.5 | 0.4 | 0.5 |
| CaCO₃ | 0.6 | 0.6 | 0.6 |
| Cellulose powder | — | — | 1.3 |
| Isobutylidene diurea | 1.3 | — | — |
| Crude protein (%) | 16.93 | 16.76 | 14.41 |
| Total digestible nutrients (%) | 76.46 | 76.32 | 76.46 |
| Substitution rate of IBDU (%) | 14.88 | — | — |

(Note 4) Vitacogen: enzyme feed (trade name)

TABLE 4

| Feed Composition | No. 5 | No. 6 Reference | No. 7 Reference |
|---|---|---|---|
| Average body weight (kg) | | | |
| initiation | 35.1 | 34.6 | 35.1 |
| 10 days | 39.8 | 40.1 | 40.1 |
| 20 days | 45.4 | 45.8 | 44.9 |
| 30 days | 51.3 | 51.9 | 49.8 |
| Body weight gain (kg) | 16.3 | 17.3 | 14.7 |
| Feed conversion (note 5) | 3.21 | 3.21 | 3.67 |

(note 5) Feed conversion
Amount of feed required for 1 kg of body weight gain

As is clear from Table 4, when using the feed composition No. 5 of this invention, wherein the amounts of fish meal and soybean meal were ½ of those of the reference feed composition No. 6, a similar feed conversion was found. On the contrary, when using the feed composition No. 7, wherein the amounts of fish meal and soybean meal were ½ of those of the feed composition No. 6 and isobutylidene diurea was not added, the feed conversion was low. Accordingly, it is clear that the feed of this invention can be effectively used as a substitute for a natural protein source.

EXAMPLE 3

Twelve Japanese white rabbits (6 female, 6 males, 100 days old) were divided into 3 groups (2 female; 2 males). They were fed by water feeding ad libitum and each was given a controlled feeding of one of the feed compositions No. 8–10 of Table 5 along with green grass, for 30 days. The results are shown in Table 6 and Table 7.

TABLE 5

| Feed Composition | No. 8 | No. 9 Reference | No. 10 Reference |
|---|---|---|---|
| Oats | 36 | 36.9 | 30 |
| Rice bran | 20 | 20 | 16 |
| Wheat bran | 31 | 31 | 35 |
| Soybean meal | 6.5 | 6.5 | 15 |
| Isobutylidene diurea | 2.5 | — | — |
| Urea | — | 1.6 | — |
| CaCO$_3$ | 3 | 3 | 3 |
| NaCl | 1 | 1 | 1 |
| Total | 100 | 100 | 100 |
| Digestible crude protein (%) | 15.30 | 15.25 | 14.85 |
| Total digestible nutrients | 64.48 | 65.08 | 66.33 |
| Substitution rate of IBDU (%) | 22.2% | — | — |

The amount of the feed composition given was 2 wt.% of the total body weight and the amount of green grass fed was 16 wt.% of the total body weight. All of the feed compositions and half of the green grass were given in the morning. The remaining green grass was supplied in the evening. No residual feed was found and the conditions of the feed-intake was good.

TABLE 6

Change of body weight and weight gain (average):

| Feed Composition | No. 8 body weight (g) | No. 8 weight gain (g) | No. 9 Reference body weight (g) | No. 9 Reference weight gain (g) | No. 10 Reference body weight (g) | No. 10 Reference weight gain (g) |
|---|---|---|---|---|---|---|
| Initiation | 2,290 | — | 2,310 | — | 2,300 | — |
| 10 days | 2,500 | 210 | 2,510 | 200 | 2,500 | 200 |
| 20 days | 2,720 | 220 | 2,760 | 250 | 2,760 | 260 |
| 30 days | 3,000 | 280 | 2,990 | 230 | 3,000 | 240 |
| Total | | 710 | | 680 | | 700 |

TABLE 7

Amount of feed-intake (average):

| Feed Composition | No. 8 feed comp. | No. 8 green grass | No. 9 Reference feed comp. | No. 9 Reference green grass | No. 10 Reference feed comp. | No. 10 Reference green grass |
|---|---|---|---|---|---|---|
| Initiation –10 days | 460(g) | 3,660(g) | 460(g) | 3,680(g) | 460(g) | 3,680(g) |
| 11–20 days | 500 | 4,000 | 500 | 4,000 | 500 | 4,000 |
| 21–30 days | 550 | 4,350 | 540 | 4,420 | 540 | 4,420 |
| Initiation –30 days | 1,510 | 12,010 | 1,500 | 12,100 | 1,500 | 12,100 |
| Feed conversion | 2.1 | 16.9 | 2.21 | 17.8 | 21 | 17.3 |

As shown in Table 6, the body weight gain was high when the feed composition of this invention was used. As is clear from Table 7, when using the feed composition No. 8 of this invention wherein the amount of the digestive protein of the soybean meal was ½ of that of the feed composition No. 10. the feed conversion was substantially the same, demonstrating that isobutylidene diurea acts as a protein source.

EXAMPLE 4

Three Anglo-Norman type hybrid geldings (10–11 months old) were fed by water feeding ad libitum. Each was given a controlled feeding of one of the feed compositions No. 11–13 of Table 8 and 60 g of sodium chloride for 30 days. The results are shown in Table 9.

TABLE 8

Feeding (per day per head):

| Feed Composition | No. 11 | No. 12 Reference | No. 13 Reference |
|---|---|---|---|
| Cracked barley | 800 (g) | 800 (g) | 800 (g) |
| Wheat bran | 700 | 700 | 1,000 |
| Rice bran | — | — | 300 |
| Isobutylidene diurea | 85 | — | — |
| Urea | — | 57 | — |
| Potato starch pulp | 915 | 943 | — |
| Vine of sweet potato | 1,000 | 1,000 | 1,000 |
| Milk vetch hay | 600 | 600 | 1,000 |
| Hay | 2,000 | 2,000 | 2,000 |
| Rice straw | 1,000 | 1,000 | 1,000 |
| Total | 7,100 | 7,100 | 7,100 |
| Digestible crude protein | 467 | 467 | 467 |
| Total digestible nutrients | 3,788 | 3,806 | 3,713 |
| Cellulose | 1,483 | 1,487 | 1,480 |
| Substitution rate of IBDU (%) | 24.7% | — | — |

The components of each composition, wherein the rice straw was cut, (except for the isobutylidene diurea, the urea and the hay) were mixed with the same amount of water to prepare a wet feed. ⅓ of the feed composition was supplied three times daily, in the morning, at noon and in the evening. Isobutylidene diurea was placed on the kneaded feed. The Urea was mixed with the wet feed. The hay was supplied four times daily: morning, noon, evening and night, and no bedding straw was used in the horse barn. The conditions of the feed-intake were good and no substantial amounts of residual seed was found.

TABLE 9

| Feed Composition | Change of body weight and body weight gain: | | | | | |
|---|---|---|---|---|---|---|
| | No. 11 | | No. 12 Reference | | No. 13 Reference | |
| | body weight (kg) | weight gain (kg) | body weight (kg) | weight gain (kg) | body weight (kg) | weight gain (kg) |
| Initiation | 298 | — | 301 | — | 304 | — |
| 15 days | 306.3 | 8.3 | 309 | 8.0 | 312.9 | 8.9 |
| 30 days | 314.3 | 8.0 | 315.8 | 6.7 | 320.7 | 7.8 |
| Total | | 16.3 | | 14.7 | | 16.7 |
| Weight gain per day (daily gain) | | 0.54 | | 0.49 | | 0.55 |

The change of body weight and the body weight gain are shown in Table 9. As is clear from Table 9, when using the feed composition No. 1 wherein all of the digestible protein of the rice bran and parts of that of the wheat bran and milk vetch hay are substituted by isobutylidene diurea, and potato starch pulp is added to give the same total digestive nutrients and cellulose content as compared with the feed composition No. 3, the body weight gain was substantially the same demonstrating that isobutylidene diurea acts as protein source. The feed composition No. 2 wherein urea was used instead of isobutylidene diurea imparted an inferior result.

EXAMPLE 5

Six Thoroughbred type hybrid geldings (horses) (12–14 months old) were divided into 2 groups and were fed by water feeding ad libitum. A controlled feeding of one of the feed compositions No. 1 and 2 of Table 10 and 60 g of sodium chloride was given to each for 35 days. The results are shown in Table 11.

TABLE 10

| Feed Composition | Feeding (per day per head): | |
|---|---|---|
| | No. 14 | No. 15 Reference |
| Oats | 1,000 (g) | 1,000 (g) |
| Soybean meal | — | 250 |
| Wheat bran | 700 | 800 |
| Rice bran | 1,200 | 1,000 |
| Isobutylidene diurea | 70 | — |
| Potato starch pulp | 80 | — |
| Hay | 2,000 | 2,000 |
| Rice straw | 2,000 | 2,000 |
| Total | 7,050 | 7,050 |
| Digestible crude protein | 445 | 445 |
| Total digestible neutrients | 3,614 | 3,659 |
| Cellulose | 1,399 | 1,391 |
| Substitution rate of | | |

TABLE 10-continued

| Feed Composition | Feeding (per day per head): | |
|---|---|---|
| | No. 14 | No. 15 Reference |
| IBDU (%) | 21.2% | — |

The components of each composition (except for the isobutylidene diurea and the hay) were mixed with the same amount of water to prepare a wet feed. ⅓ of the feed compositions was supplied three times daily in the morning, noon and evening. Isobutylidene diurea was placed on the wet feed. Hay was supplied four times daily in the morning, noon, evening and night, and no bedding straw was used in the horse barn. The conditions of the feed-intake were good and no substantial residual feed was found.

TABLE 11

| Feed Composition | Change of body weight and body weight gain (average): | | | |
|---|---|---|---|---|
| | No. 14 | | No. 15 Reference | |
| | body weight (kg) | weight gain (kg) | body weight (kg) | weight gain (kg) |
| Initiation | 313 | — | 330 | — |
| 3 weeks | 324.6 | 11.6 | 340.9 | 10.9 |
| 5 weeks | 330.3 | 5.7 | 346.5 | 5.6 |
| Total | | 17.3 | | 16.5 |

The change of body weight and the body weight gain are shown in Table 11. As is clear from Table 11, when using the feed composition No. 14 wherein soybean meal is substituted by isobutylidene diurea and potato starch pulp is added to give the same amount of total digestive nutrients as compared to the feed composition No. 15, the body weight gain was substantially the same demonstrating that isobutylidene diurea acts as a protein source.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method for culturing monogastric animals which have an evolved caecum selected from the group consisting of fowl, pigs, rabbits and horses which comprises feeding said animals a feed containing protein in which part of the protein is furnished by adding to said feed a urea-isobutyraldehyde condensate.

2. The method of claim 1, wherein the ratio of the urea-isobutyraldehyde condensate to the total crude protein in the feed is in the range of 5–30 wt.%.

3. The method of claim 1, wherein the urea-isobutyraldehyde condensate is isobutylidene diurea.

4. The method of claim 1, wherein the amount of the urea-isobutyraldehyde condensate is 0.5 to 4 wt.% relative to the total weight of the feed.

5. The method of claim 1, wherein said feed is a meal or bran.

6. The method of claim 1, wherein said feed is a meal.

7. The method of claim 6, wherein said meal is soybean meal or fish meal.

* * * * *